United States Patent [19]
Hibino et al.

[11] Patent Number: 5,640,629
[45] Date of Patent: Jun. 17, 1997

[54] INFORMATION RECORDING DEVICE WITH CONTROL OF FILM TRANSPORT

[75] Inventors: Hideo Hibino; Norikazu Yokonuma, both of Kanagawa-ken; Kazuyuki Kazami, Tokyo-to; Youichi Yamazaki, Kanagawa-ken, all of Japan

[73] Assignee: Nikon Corporation, Tokyo, Japan

[21] Appl. No.: 534,991

[22] Filed: Sep. 27, 1995

[30] Foreign Application Priority Data

Dec. 5, 1994 [JP] Japan .................................. 6-300971

[51] Int. Cl.$^6$ .................................................. G03B 17/24
[52] U.S. Cl. ........................ 396/319; 396/406; 360/73.06
[58] Field of Search ........................... 354/105, 106, 354/173.1, 173.11, 212, 215; 360/73.01, 73.04, 73.05, 73.06, 73.08; 396/310, 319, 406, 418

[56] References Cited

U.S. PATENT DOCUMENTS 5,504,546  4/1996  Kazami et al. ........................ 354/106

FOREIGN PATENT DOCUMENTS 4-328536  11/1992  Japan .

*Primary Examiner*—Howard B. Blankenship
*Attorney, Agent, or Firm*—Oliff & Berridge

[57] ABSTRACT

An information recording device of a camera permits recording of more information with an appropriate recording density without monitoring the film feeding speed constantly. The information recording device includes a feeding assembly to feed film mounted in a camera by a motor. A recording assembly records photographic information in the film recording area during film feeding. A feeding speed control assembly starts duty-driving of the motor to reduce the film feeding speed at the first timing and to stop the motor to halt film feeding at a later second timing. The recording control assembly permits recording of the photographic information by the recording assembly until a third timing that is later than the first timing but earlier than the second timing.

24 Claims, 6 Drawing Sheets

INFORMATION RECORDING DEVICE WITH CONTROL OF FILM TRANSPORT

BACKGROUND OF THE INVENTION

1. Field of the Invention

The present invention relates to an information recording device capable of recording information on a recording medium such as, for example, in a recording area on a film during a feeding operation for use, for example, in a camera.

2. Discussion of Related Art

Cameras capable of recording photographic data, such as, for example, the photograph date or the exposure values, on each photographic frame of film on a magnetic recording medium coated on the film are known. In these cameras, a film feeding motor begins winding of one frame of film upon completion of a photographing operation for an arbitrary frame. The recording of photographic information by a magnetic head begins after stabilization of the film feeding speed. After the recording of the photographic information is complete, the film feeding speed is reduced by duty-driving the film feeding motor. Upon completion of winding the film the equivalent of one frame, the film feeding speed is reduced. Performing information recording only during stabilization of the film feeding speed in this manner prevents reading errors during information retrieval by making the recording density approximately uniform.

However, performing information recording only after the film feeding speed is stabilized and before the start of duty-driving limits the amount of photographic information that can be recorded. To record more information, it is necessary to increase the frequency of the recording signals. However, increasing the recording signal frequency raises the recording density when the film feeding speed is relatively low, which causes frequent reading errors.

A method can be adopted in which the frequency of the recording signals is changed appropriately according to the amount of information to be recorded and the feeding speed while monitoring the film feeding speed that permits recording of more information with an appropriate recording density. However, the film feeding speed is not always uniform, due to temperature and the battery capacity, and the feeding velocity must always be monitored always during film feeding if the above method is adopted. This requires a feeding speed monitoring device such as a pulse film encoder, causing an increase in cost.

SUMMARY OF THE INVENTION

An object of the present invention is to overcome the above problems by providing an information recording device capable of recording more information with an appropriate recording density without always monitoring the recording medium feeding speed.

This and other objects of the invention are achieved by providing an information recording device for recording information on a recording medium that permits recording of more information without constantly monitoring the recording medium feeding speed. The information recording device includes a feeding assembly that feeds the recording medium through the information recording device positioned, for example, within a camera at a feeding speed during a feeding operation. An information recording assembly records information on the recording medium during the feeding operation. The information recording assembly may include a magnetic head to record information in a recording area on the recording medium.

A feeding controller is connected to the feeding assembly and controls the feeding assembly to reduce the recording medium feeding speed at a first timing after information recording has started. The feeding controller also controls the feeding assembly to stop feeding the recording medium at a second timing after the first timing.

A recording controller is connected to the information recording assembly and controls the operation of the information recording assembly. The recording controller controls the information recording assembly to permit information recording until a third timing between the first timing and the second timing. The recording controller controls the information recording assembly to begin information recording after stabilization of the feeding speed is detected.

Additionally, the information recording device may also include a warning assembly that performs a warning operation if recording of all the information is not completed even upon reaching the third timing.

In accordance with another aspect of the present invention, there is provided a method of recording information on a recording medium such as, for example, film. The method includes feeding the recording medium at a recording medium feeding speed. Information is then recorded on the recording medium. The recording medium feeding speed is reduced at a first timing after information recording is initiated. The feeding of the recording medium is then stopped at a second timing after the first timing. Information recording on the recording medium continues until a third timing between the first and second timings.

BRIEF DESCRIPTION OF THE DRAWINGS

The invention will be described in conjunction with the following drawings in which like reference numerals designate like elements and wherein.

DETAILED DESCRIPTION OF PREFERRED EMBODIMENTS

A preferred embodiment of the present invention will be explained in reference to FIGS. 1–7.

Figure 1:
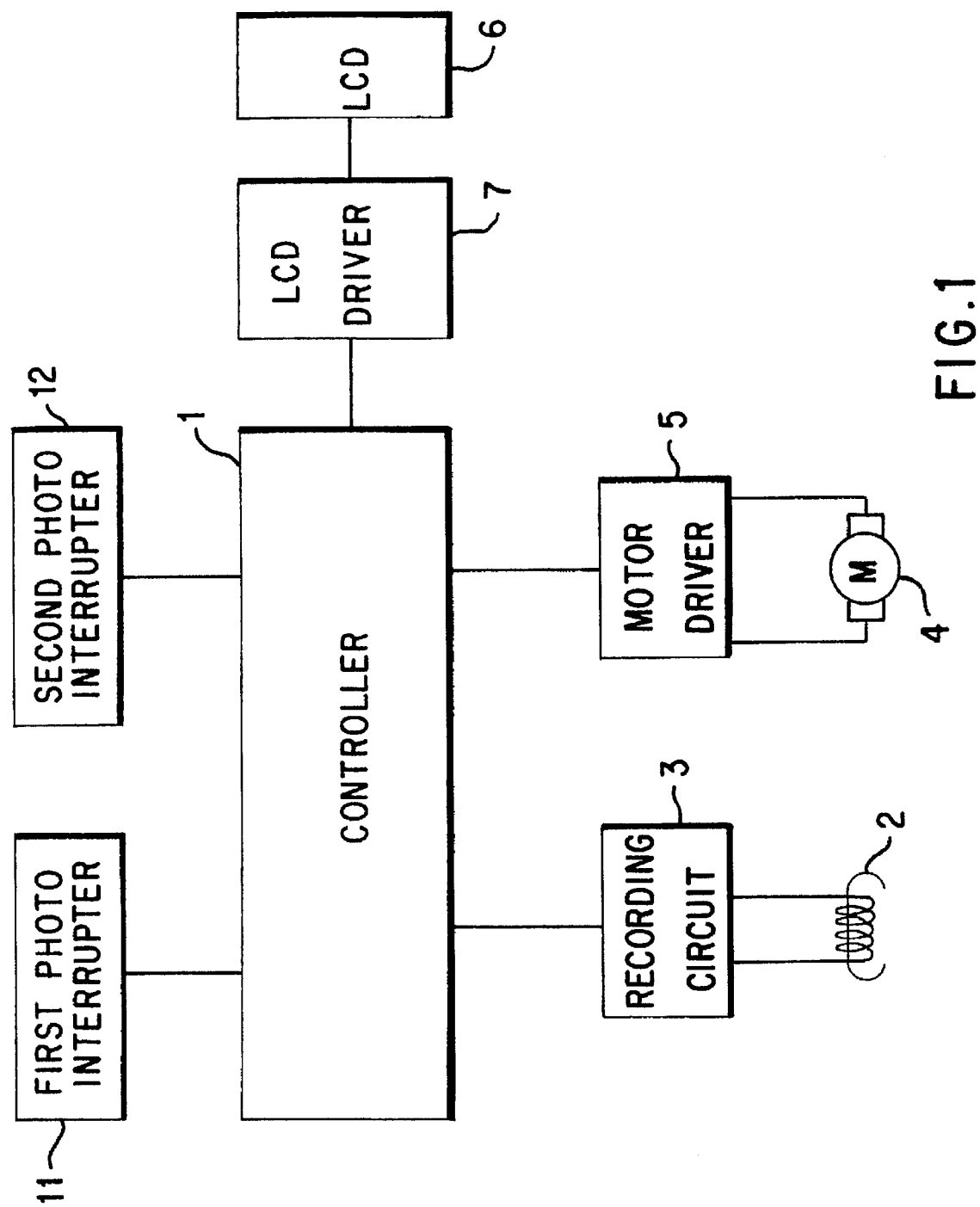
FIG. 1 is a block diagram illustrating the structure of a control system for an information recording device according to an embodiment of the present invention.

FIG. 1 is a block diagram illustrating an information recording device according to an embodiment of the present invention. The information recording device includes a controller 1. First and second perforation detection photo interrupters 11 and 12 are connected to the controller 1. A recording circuit 3 records photographic information for each frame on a magnetic track TR of the film F1, shown in FIGS. 2 and 3 by driving a magnetic head 2. The recording circuit 3 is connected to the controller 1. A motor driver 5 winds and rewinds the film F1 by driving a film feeding motor 4. The motor driver 5 is connected to the controller 1. An LCD driver 7 operates a liquid crystal display device (LCD) 6. The photographic information recorded on the film F1 by the magnetic head 2 may include, for example, the photograph date, the exposure value, whether an electronic flash device operated, and a focal distance of a photographic lens assembly.

Figure 2:
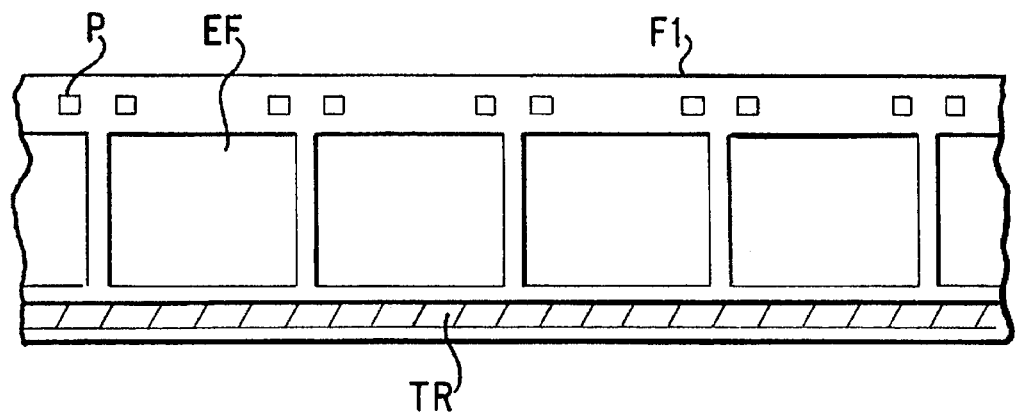
FIG. 2 illustrates the structure of the film.
Figure 3:
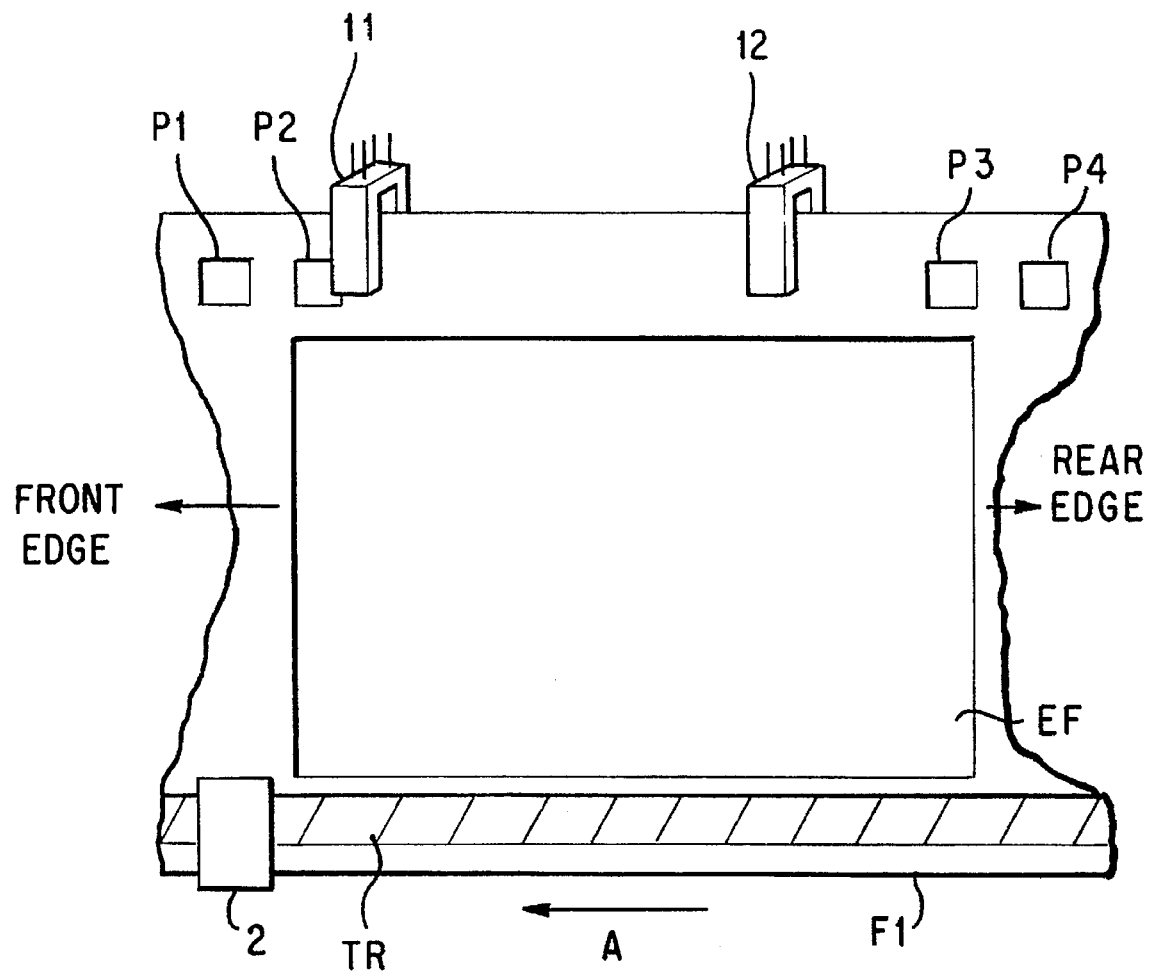
FIG. 3 illustrates the location of the photo interrupters and the magnetic head with respect to the film according to an embodiment of the present invention.

FIGS. 2 and 3 illustrate the location of the film perforations P and magnetic track TR in film F1. FIG. 3 illustrates the location of the first and the second photo interrupters 11 and 12 and the magnetic head 2 with respect to the film F1.

As illustrated in FIG. 2, the perforations P are regularly located along a length direction on an upper portion of the film F1. The film F1 includes a plurality of photographic frames EF. Four perforations P1–P4 are located in the vicinity of each frame EF of film F1, as illustrated in FIG. 3. Two perforations P1 and P2 are located in the vicinity of the front edge of film F1, as shown in FIG. 3. Two perforations P3 and P4 are located in the vicinity of the rear edge of film F1, as shown in FIG. 3.

FIG. 3 illustrates the position of film F1 when a photographic frame EF is facing a camera aperture, not shown. The first and second photo interrupters 11 and 12 are known and include a light casting unit and a light receiving unit, respectively. The photo interrupters 11 and 12 are positioned to face each other and pinch the film F1. The first photo interrupter 11 detects the front side edge of the second perforation P2. The second photo interrupter 12 is positioned between the second perforation P2 and the third perforation P3, closer to the third perforation P3.

Figure 4:
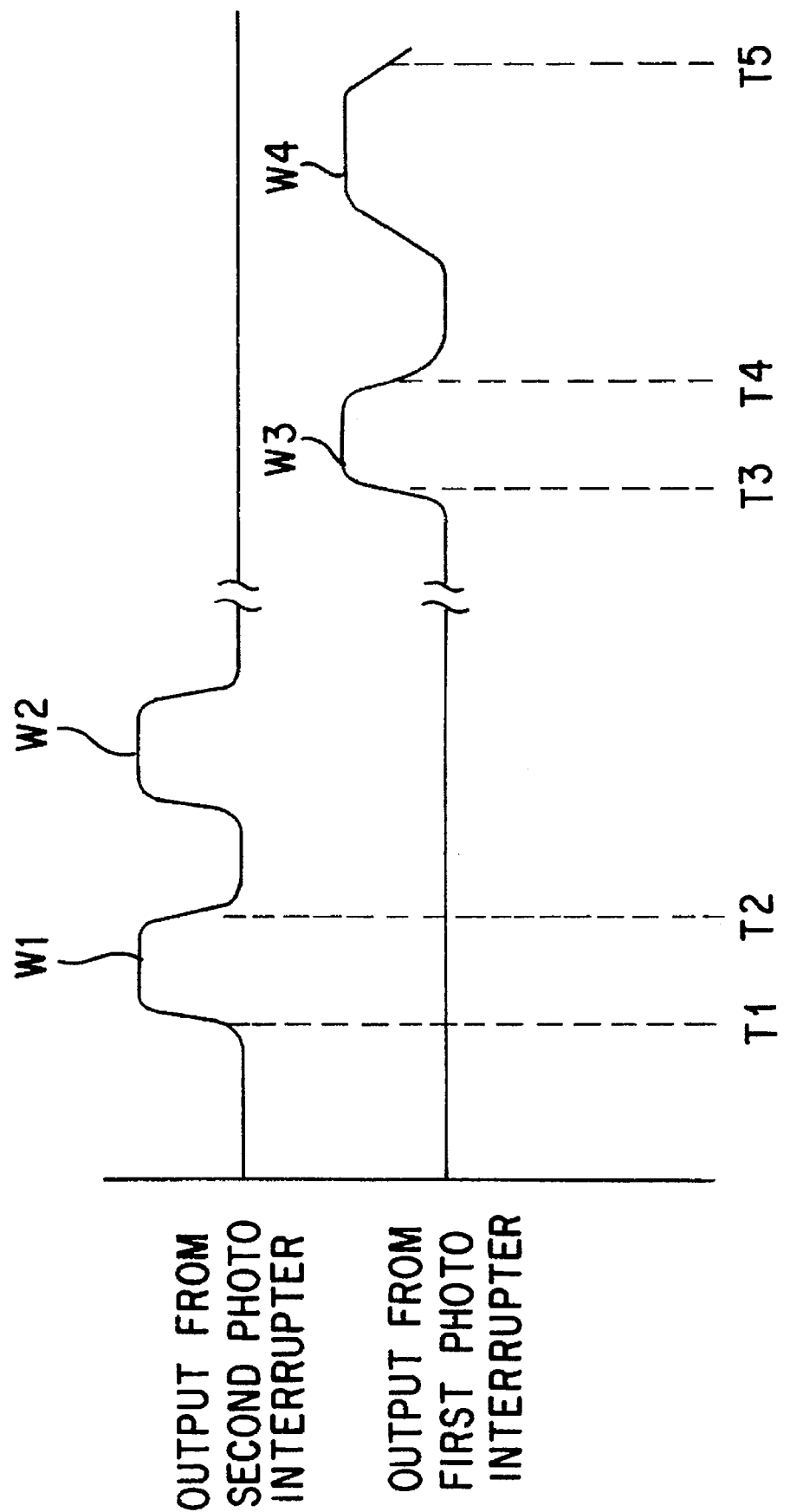
FIG. 4 illustrates the wave pattern output of the first and the second photo interrupters.

FIG. 4 illustrates the wave pattern output for the photo interrupters 11 and 12 when the film F1 is fed in the direction A, as shown in FIG. 3, the equivalent of one frame. When the film F1 is fed in the direction A, as shown in FIG. 3, the second interrupter 12 detects the third perforation P3, and the wave pattern output for the second photo interrupter changes to W1, as shown in FIG. 4. T1 and T2 represent the times when the second photo interrupter 12 detects the front-side edge and the rear-side edge of the perforations P3, respectively. The wave pattern output changes to W2 with the detection of the fourth perforation P4 by the second photo interrupter 12.

As the film F1 advances, the first photo interrupter 11 detects the third perforation P3, and the wave pattern output for the first photo interrupter changes to W3, as shown in FIG. 4. T3 and T4 represent the times when the first photo interrupter 11 detects the front-side edge and the rear-side edge of the third perforation P3, respectively. Moreover, with the detection of the fourth perforation P4 by the first photo interrupter 11 later, the output wave pattern changes. The signal wave pattern W4 is broader than the others (i.e., W1, W2 and W3) because the film feeding speed is reduced by duty-driving the film feeding motor 4 at time T3. T5 represents the time when the first photo interrupter 11 detects the rear-side edge of the fourth perforation P4.

As shown in FIG. 3, a bottom section of the film F1 has a magnetic track TR extending in the lengthwise direction. The magnetic head 2 is able to contact the magnetic track TR and is positioned at the front-side edge section of the photographic frame EF when the photographic frame EF faces the aperture. When the film F1 is fed in direction A, the photographic information concerning the photographic frame EF is recorded on the magnetic track TR by the magnetic head 2.

In the illustrated embodiment, the controller 1 is implemented as a single special purpose integrated circuit (e.g., ASIC) having a main or central processor section for overall, system-level control, and separate sections dedicated to performing various different specific computations, functions and other processes under control of the central processor section. It will be appreciated by those skilled in the art that the controller 1 can also be implemented using a plurality of separate dedicated or programmable integrated or other electronic circuits or devices (e.g., hardwired electronic or logic circuits such as discrete element circuits, or programmable logic devices such as PLDS, PLAs, PALs or the like). The controller 1 can also be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the flow charts shown in FIGS. 5 and 6 can be used as the controller 1. As shown, a distributed processing architecture is preferred for maximum data/signal processing capability and speed.

Figure 5:
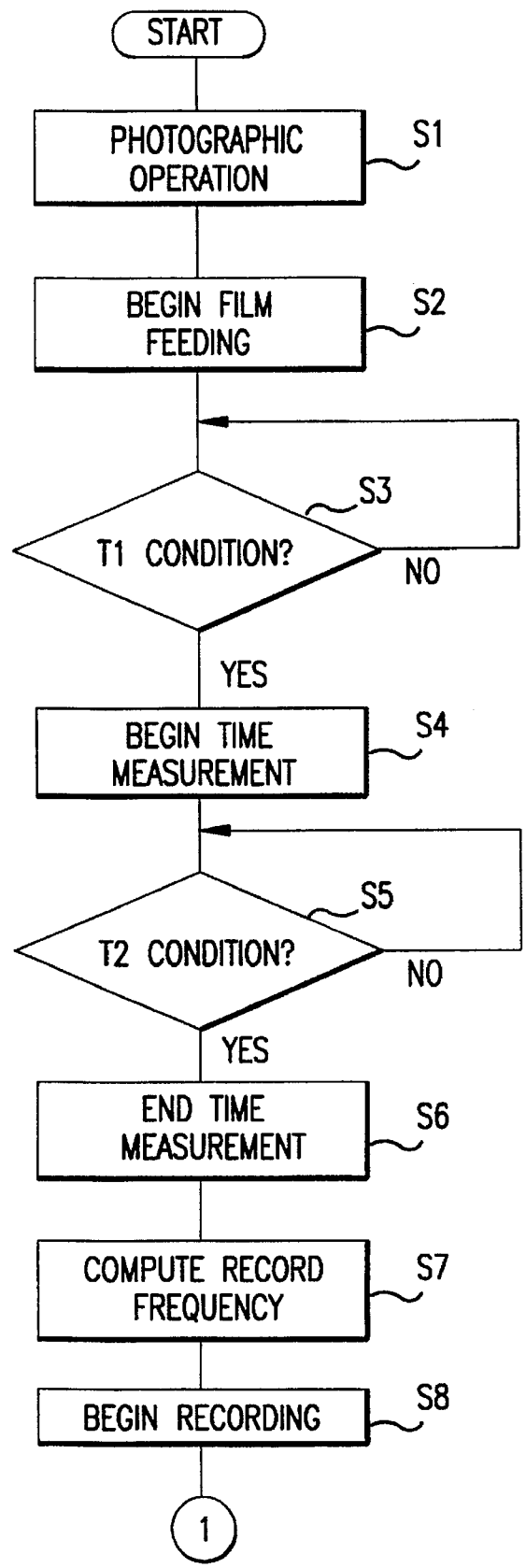
FIG. 5 is a flow chart illustrating the photographic information recording control operation.
Figure 6:
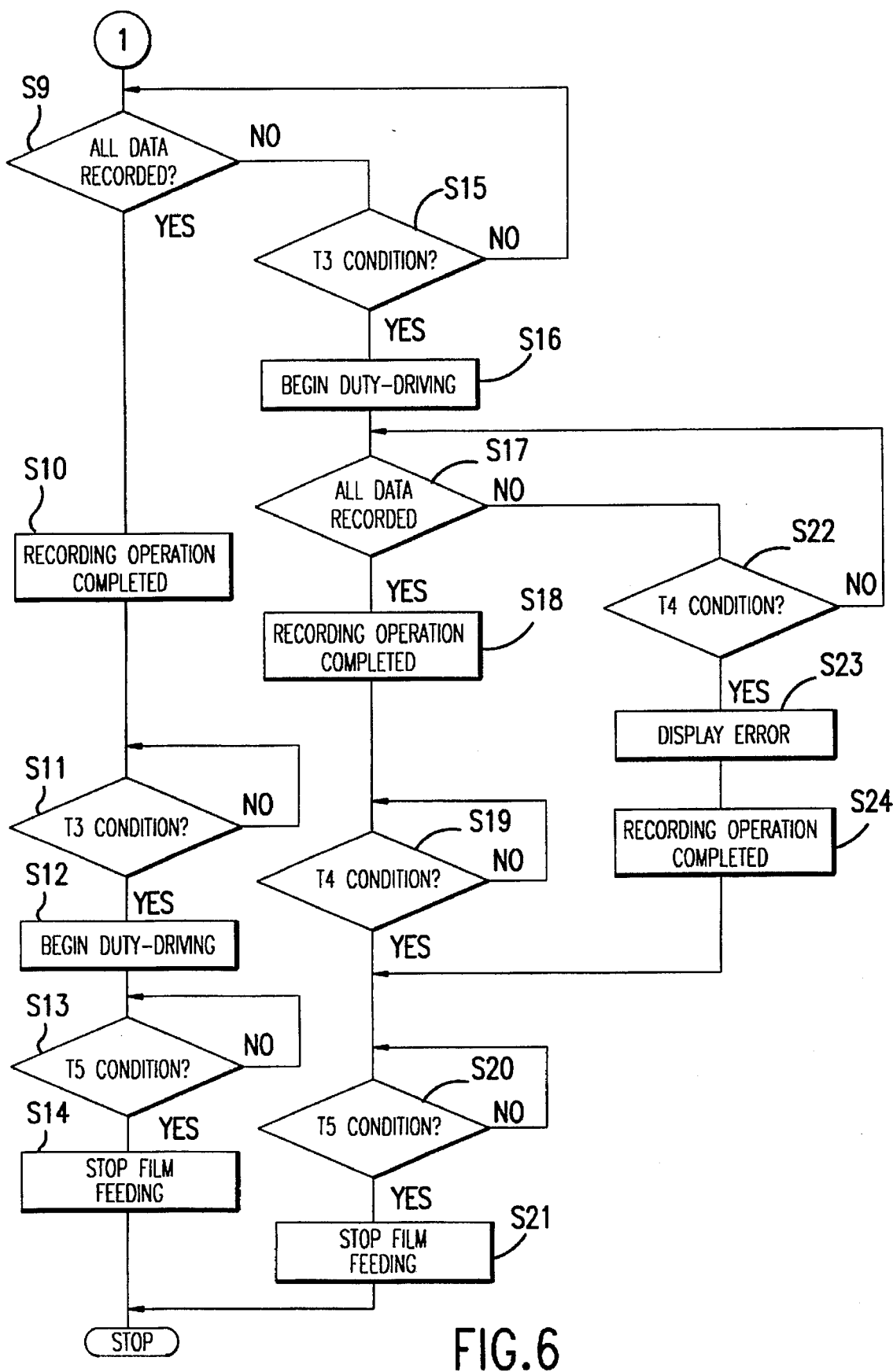
FIG. 6 is a flow chart continuing from FIG. 5.

Next, the operation of the controller 1 for magnetic recording control will be described with reference to the flow charts illustrated in FIGS. 5 and 6. The magnetic recording control operation is started in response to a shutter operation. In step S1, a photographic operation is initially conducted. The photographic operation includes distance measurement, photometry, and shutter driving. After completion of the photographic operation, the motor driver 5 drives the film feeding motor 4 in step S2 to begin film winding. As a result, the film F1 is fed in direction A, as shown in FIG. 3. The operation of the controller 1 proceeds to step S3. In step S3, the controller determines whether the second photo interrupter 12 detects the front-side edge of the third perforation P3 (i.e., whether the condition of time T1, as shown in FIG. 4, is achieved). This may be accomplished by detecting a rise in the wave pattern output of the second photo interrupter 12.

Figure 7:
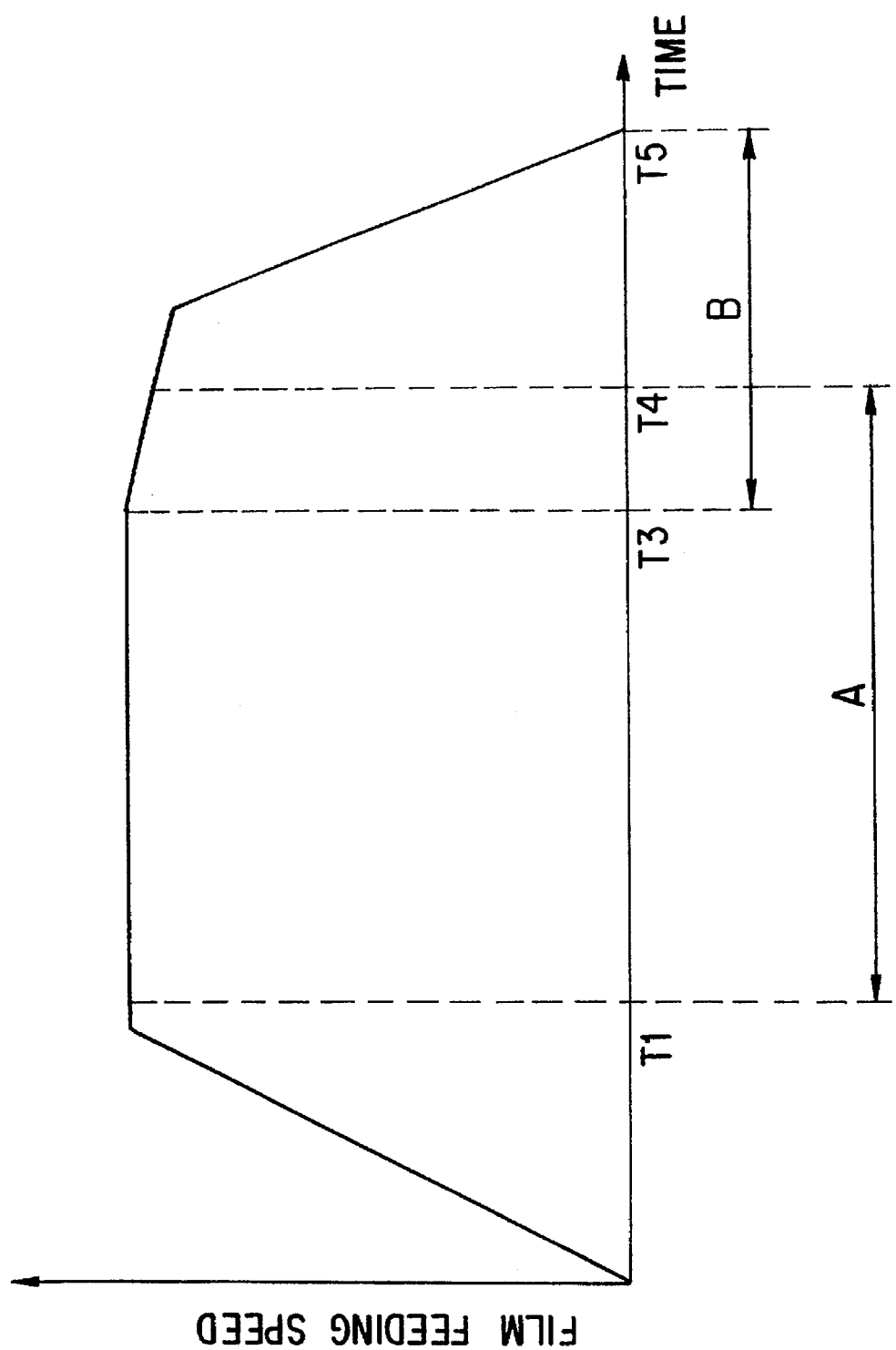
FIG. 7 illustrates the change in film feeding speed.

As illustrated in FIG. 7, the film feeding speed of film F1 is accelerated from the start of the driving of the film feeding motor 4. The film feeding speed is stabilized by time T1 when the controller 1 determines that the second photo interrupter 12 has detected the front-side edge of the third perforation P3 in step S3. After the front-side edge of perforation P3 is detected in step S3, the operation of the controller 1 proceeds to step S4, and time measurement begins for detecting the film feeding speed. The time measurement may be performed by a timer installed in the controller 1. In step S5, the controller 1 determines whether the second photo interrupter 12 detects the rear-side edge of the third perforation P3 (i.e., whether a condition of time T2, as shown in FIG. 4, is achieved). This may be accomplished by detecting a fall in the wave pattern output of the second photo interrupter 12. After the rear-side edge of the third perforation P3 is detected in step S5, the operation of the controller 1 proceeds to step S6 where time measurement is completed. The operation of the controller 1 then proceeds to step S7.

In step S7, the film feeding speed of the film F1 is determined based on the time period measured by the timer between the detection of the front-side edge and the rear-side edge of the third perforation P3 by the second photo interrupter 12. The recording frequency of the magnetic record signal is then established based on the film feeding speed and the amount of photographic information to be recorded. The recording frequency is established according to the film feeding speed such that the recording density on the magnetic track TR is not overly high. This permits recording of as much photographic information as possible. As a result, a faster feeding speed produces a higher cycle of recording signals.

In step S8, magnetic recording of photographic information is started. The photographic information to be recorded is transformed to recording signals with the frequency established in step S7. The recording signals are recorded on the magnetic track TR of the film F1 by the magnetic head 2 through the recording circuit 3 as the film feeding motor 4 advances the film F1. The operation of the controller 1 proceeds to step S9.

In step S9, the controller 1 determines whether the magnetic recording of all the photographic information for the current photographic frame EF is complete. In step S9, when the recording operation is not complete, the operation of the controller 1 proceeds to step S15. In step S15, the controller 1 determines whether the first photo interrupter 11 detects the front-side edge of the third perforation P3 (i.e., whether a condition of time T3 is achieved), as shown in FIG. 4. If the condition at time T3 is not achieved, the operation of the controller 1 returns to step S9. In step S9 when the magnetic recording is completed before detection of the front-side edge of the third perforation P3 by the first photo interrupter 11 (i.e., before reaching T3), the operation of the controller 1 proceeds to step S10.

In step S10, the recording by the magnetic head 2 is stopped, and the recording operation is completed. The operation of the controller 1 proceeds to step S11. In step S11, the controller 1 waits until the front-side edge of the third perforation P3 is detected by the first photo interrupter 11. Duty-driving of the film feeding motor 4 then begins in step S12. In other words, the motor 4 is driven intermittently with a predetermined duty ratio. This duty-driving reduces the film feeding speed starting at time T3, as illustrated in FIG. 7.

In step S13, the controller 1 waits until the rear-side edge of the fourth perforation P4 (e.g., the equivalent of the second perforation of the next frame) is detected by the first photo interrupter 11. This occurs at the time T5. The duty-driving of the film feeding motor 4 is stopped, and film feeding is stopped in step S14. The film F1 has been fed the equivalent of one photographic frame, and the next photographic frame faces the aperture. The magnetic recording control operation is complete.

When the front-side edge of the third perforation P3 is detected in step S15 by the first interrupter 11 before completion of the recording of all the photographic information, duty-driving of the film feeding motor 4 begins in step S16. The duty-driving causes the film feeding speed to drop from time T3, as described above. In step S17, the controller 1 determines whether all the photographic information has been recorded. If the recording is not complete, the operation of the controller 1 proceeds to step S22. In step S22, the controller 1 determines whether the first photo interrupter 11 detects the rear-side edge of the third perforation P3 (i.e., whether the condition at time T4 is achieved). If the condition of time T4 is not achieved, operation of the controller 1 returns to step S17.

When the recording of photographic information is complete in step S17 before the condition of time T4 is achieved, the recording operation is completed in step S18. In step S19, the controller 1 waits until the rear-side edge of the third perforation P3 is detected by the first photo interrupter 11 (i.e., until the condition of time T4 is achieved). The operation of the controller 1 then proceeds to step S20. In step S20, the controller waits until the first photo interrupter 11 detects the rear-side edge of the fourth perforation P4 (i.e., until the condition at T5 is achieved). In step S21, the film feeding motor 4 is stopped, and film feeding is halted because the film F1 has been fed the equivalent of one frame, and the next photographic frame faces the camera aperture. The photographic information recording control operation is complete.

When the recording of photographic information is not complete in step S17, the operation of the controller 1 proceeds to step S22, as discussed above. The operation of the controller 1 proceeds to step S23 when the rear-side edge of the perforation P3 is detected by the first photo interrupter 11 (i.e., condition of time T4). In step S23, an error display or warning is sent to the LCD 6 through the LCD driver 7. The recording operation is complete in step S24. The operation of the controller 1 then proceeds to step S20.

As described above, in the present embodiment, feeding of one frame of film F1 begins upon completion of exposure of an arbitrary photographic frame, and information recording operation begins at time T1, as shown in FIG. 7, where stabilization of the film feeding speed is detected. The time period B in FIG. 7 represents the time period from the start of duty-driving to the halting of film feeding. The time period A in FIG. 7 represents the time period during which photographic information recording is permitted. As illustrated in FIG. 7, photographic information recording is allowed until time T4 after duty-driving of the motor 4 has begun. This permits the recording of more photographic information as compared to the case when information recording is stopped before starting duty-driving. During the period between time T3 and T4, the film feeding speed is not greatly reduced because of the inertia of the motor 4 even though duty-driving is being performed. As a result, the recording density does not become too high even as photographic information recording is conducted during this period. After time T4, the film feeding speed is reduced drastically, and film feeding stops at time T5.

In the above described embodiment, the film feeding motor 4 and the motor driver 5 form a feeding assembly. The magnetic head 2 and the recording circuit 3 are part of a recording assembly. The LCD 6 and the LCD driver 7 are included in a warning assembly. The controller 1 includes a feeding speed control assembly for controlling the feeding assembly and a recording control assembly for controlling the recording assembly.

In the above described embodiment, time T3 corresponds to a first timing, time T5 corresponds to a second timing, and time T4 corresponds to a third timing. Moreover, time T4 represents a third timing where the first photo interrupter 11 detects the rear-side edge of the third perforation P3. However, the third timing may also be represented by a time after a predetermined time has elapsed from time T3. Moreover, in the above-described embodiment, an example is shown wherein photographic information is recorded for each photographic frame, but the present invention may also be used to record photographic information to specify, such as, for example, film type regardless of the photographic frame. As a result, the timing of photographic information recording is not limited to the time of winding one frame of each photographic frame, and film loading time and the like can be used with equal success.

In the above-described embodiment, a normal winding type camera is used for illustrative purposes, but the present invention may also be applied to a pre-winding type camera in which film is wound to an end edge once, then the film is rewound with each photographic operation. Moreover, the film feeding speed is detected prior to information recording to determine the frequency of the recording signals, but detection of this feeding speed is not a mandatory requirement for the present invention, and recording with a constant frequency works equally well. Furthermore, the photographic information recording method is not limited to magnetic recording.

After duty-driving of the film feeding motor is started upon commencement of information recording, information recording is allowed until a predetermined timing, such as, the third timing. Hence, recording of more information with an appropriate recording density is possible without requiring a feeding speed monitor, such as, a pulse type film encoder.

By providing a warning or error display when recording of all the photographic information is not complete, especially after reaching the third timing mentioned above when all the information is unable to be recorded, the photographer can be notified of the situation.

While this invention has been described in conjunction with specific embodiments thereof, it is evident that many alternatives, modifications and variations will be apparent to those skilled in the art. Accordingly, the preferred embodiments of the invention as set forth herein are intended to be illustrative not limiting. Various changes may be made without departing from the spirit and scope of the invention as defined by the following claims.

What is claimed is:

1. An information recording device of a camera for recording photographic information on film having a film recording area, the information recording device comprising:

a film feeding assembly that feeds the film within the camera at a film feeding speed during a film feeding operation;

an information recording assembly that records information on the film recording area during the film feeding operation;

a feeding controller connected to said film feeding assembly that controls said film feeding assembly to reduce the film feeding speed at a first timing after information recording has begun, said feeding controller stopping film feeding by said film feeding assembly at a second timing after said first timing; and a recording controller connected to said information recording assembly that controls the operation of said information recording assembly to record information until a third timing between said first timing and said second timing.

2. The information recording device according to claim 1, further comprising a warning assembly that performs a warning operation when information recording is not complete at said third timing.

3. The information recording device according to claim 1, wherein said feeding controller controls said film feeding assembly to begin film feeding of one exposure frame of the film upon completion of an exposure operation by the camera.

4. The information recording device according to claim 1, wherein said information recording assembly includes a magnetic head that records information in the film recording area of the film.

5. The information recording device according to claim 1, wherein said recording controller controls said information recording assembly to begin information recording after film feeding is started when stabilization of the film feeding speed is detected.

6. An information recording device for a camera for recording photographic information on film having a film recording area, the information recording device comprising:

feeding means for feeding the film within the camera at a film feeding speed during a film feeding operation;

recording means for recording information on the film recording area during the film feeding operation;

feeding control means for controlling said feeding means to reduce the film feeding speed at a first timing after information recording has started, said feeding control means stopping film feeding by said feeding means at a second timing after said first timing; and recording control means for controlling the operation of said recording means to record information until a third timing between said first timing and said second timing.

7. The information recording device according to claim 6, further comprising warning means for performing a warning operation when information recording is not complete at said third timing.

8. The information recording device according to claim 6, wherein said feeding control means controls said feeding means to begin feeding of one exposure frame of the film upon completion of an exposure operation by the camera.

9. The information recording device according to claim 6, wherein said recording control means controls said recording means to begin information recording after film feeding is started when stabilization of the film feeding speed is detected.

10. An information recording device for recording information on a recording medium, the information recording device comprising:

a feeding assembly that feeds the recording medium through said information recording device at a feeding speed during a feeding operation;

an information recording assembly that records information on the recording medium during the feeding operation;

a feeding controller connected to said feeding assembly that controls said feeding assembly to reduce the feeding speed at a first timing after information recording has started, said feeding controller controlling said feeding assembly to stop feeding the recording medium at a second timing after said first timing; and a recording controller connected to said information recording assembly that controls the operation of said information recording assembly to record information until a third timing between said first timing and said second timing.

11. The information recording device according to claim 10, further comprising a warning assembly that performs a warning operation if recording of all the information is not completed even upon reaching said third timing.

12. The information recording device according to claim 10, wherein said information recording assembly includes a magnetic head to record information in the recording area on the recording medium.

13. The information recording device according to claim 10, wherein said recording controller controls said information recording assembly to begin information recording after stabilization of the feeding speed is detected.

14. An information recording device for recording information on a recording medium, the information recording device comprising:

feeding means for feeding the recording medium through the information recording device at a feeding speed during a feeding operation;

recording means for recording information on the recording medium during the feeding operation;

feeding control means for controlling said feeding means to reduce the feeding speed at a first timing after information recording has started, said feeding control means stopping feeding by said feeding means at a second timing after said first timing; and recording control means for controlling the operation of said recording means to record information until a third timing between said first timing and said second timing.

15. The information recording device according to claim 14, further comprising warning means for performing a warning operation when information recording is not complete at said third timing.

16. The information recording device according to claim 14, wherein said recording control means controls said recording means to begin information recording after stabilization of the feeding speed is detected during feeding operation.

17. A method of recording photographic information on a film having a film recording area using an information recording device including a film feeding assembly, an information recording assembly that records information on the film recording area, a feeding controller that controls the film feeding assembly connected to the film feeding assembly, and a recording controller connected to the information recording assembly that controls the information recording assembly, said method comprising the steps of:

feeding film at a film feeding speed with the film feeding assembly through the information recording device;

recording the photographic information on the film recording area of the film with the information recording assembly;

reducing the film feeding speed by controlling the film feeding assembly with the feeding controller at a first timing after information recording is initiated;

stopping film feeding by controlling the film feeding assembly with the feeding controller at a second timing after the first timing; and stopping photographic information recording on the film recording area with the information recording assembly at a third timing between the first and second timings.

18. The method according to claim 17, further comprising the step of performing a warning operation when information recording is not complete at the third timing.

19. The method according to claim 17, further comprising the step of detecting when the film feeding speed is stabilized.

20. The method according to claim 19, wherein said step of recording information begins after said detecting step.

21. A method of recording information on a recording medium comprising the steps of:

feeding the recording medium at a recording medium feeding speed;

recording information on the recording medium;

reducing the recording medium feeding speed at a first timing after information recording is initiated; and stopping recording medium feeding at a second timing after the first timing; and stopping photographic information recording on the recording medium at a third timing between the first and second timings.

22. The method according to claim 21, further comprising the step of performing a warning operation when information recording is not complete at the third timing.

23. The method according to claim 21, further comprising the step of detecting when the recording medium feeding speed is stabilized.

24. The method according to claim 23, wherein said step of recording information begins after said detecting step.

* * * * *